April 18, 1961  J. E. DELK, SR  2,980,011
WARMING RACK FOR TOASTERS
Filed Oct. 25, 1956  3 Sheets-Sheet 1
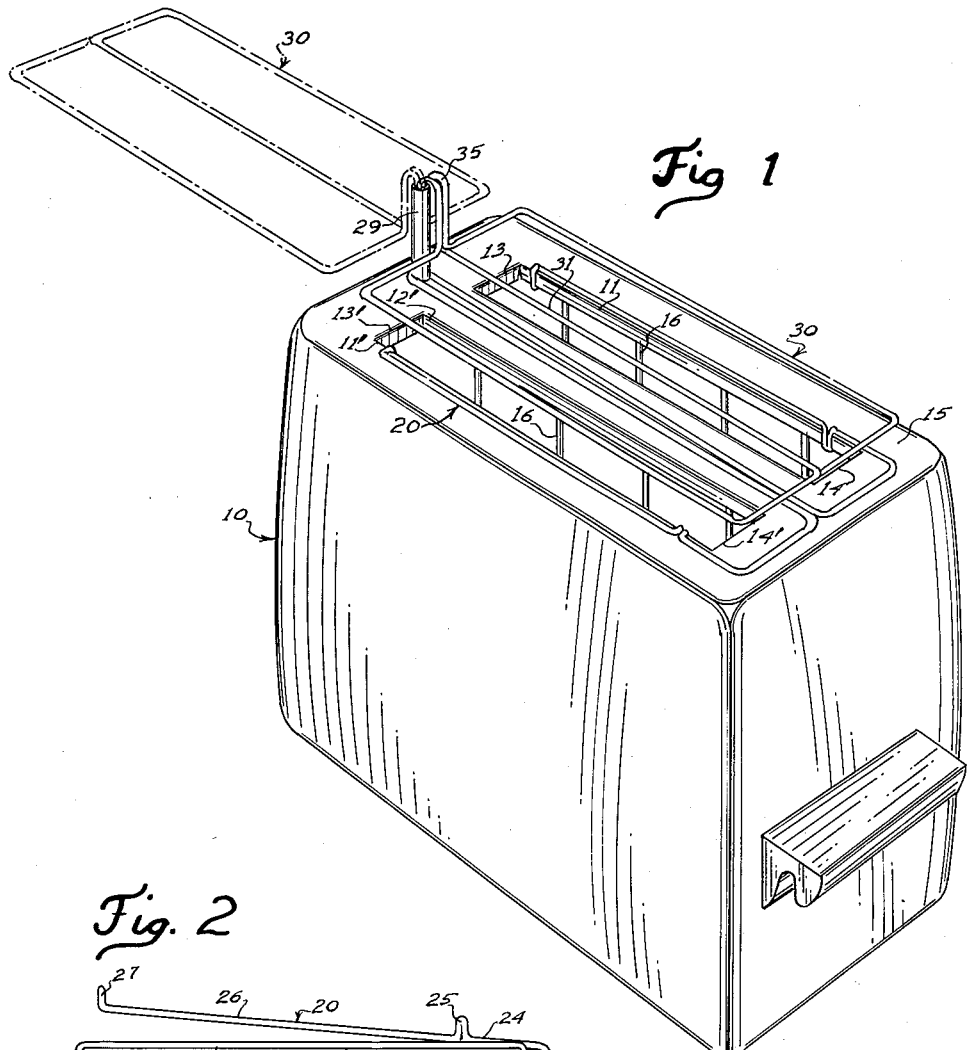
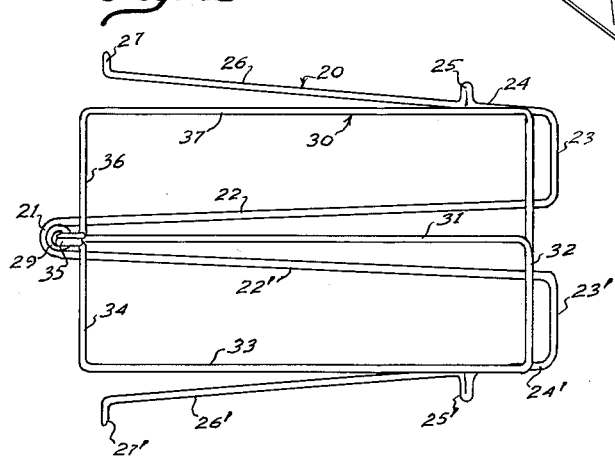
INVENTOR.
JAMES E. DELK, SR.
BY
ATTORNEY April 18, 1961 J. E. DELK, SR 2,980,011
WARMING RACK FOR TOASTERS
Filed Oct. 25, 1956 3 Sheets-Sheet 2
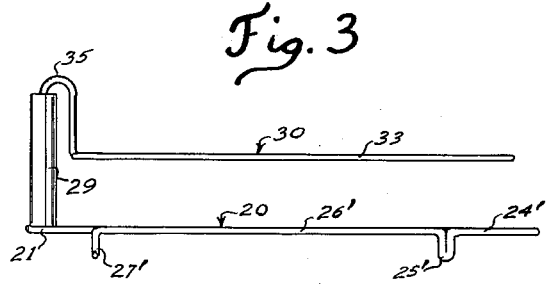
Fig. 3
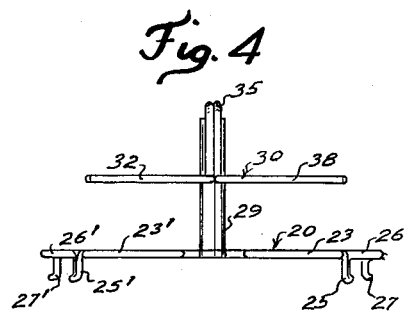
Fig. 4
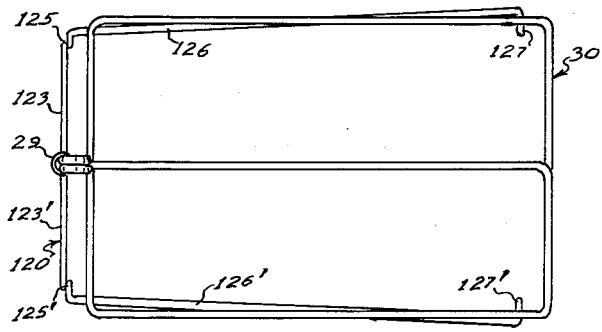
Fig. 5
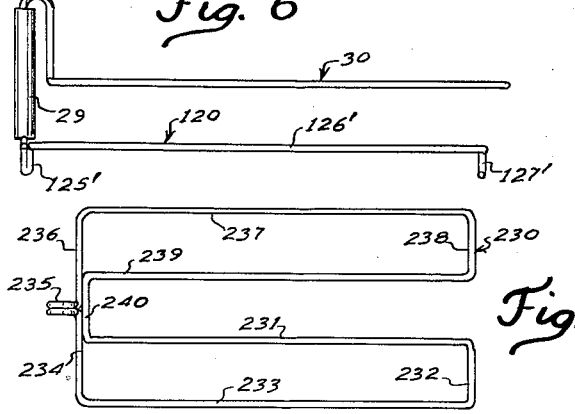
Fig. 6
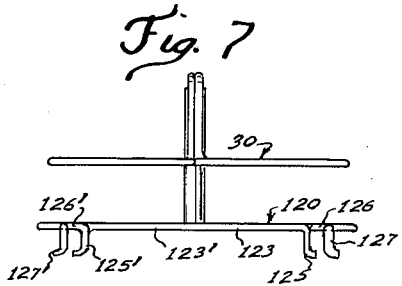
Fig. 7
Fig. 8
INVENTOR.
JAMES E. DELK, SR.
BY
ATTORNEY April 18, 1961 J. E. DELK, SR 2,980,011
WARMING RACK FOR TOASTERS
Filed Oct. 25, 1956 3 Sheets-Sheet 3

INVENTOR.
JAMES E. DELK, SR.
BY
ATTORNEY

United States Patent Office 2,980,011
Patented Apr. 18, 1961

2,980,011
WARMING RACK FOR TOASTERS
James E. Delk, Sr., 2126 Ponce de Leon Ave. NE., Atlanta, Ga.
Filed Oct. 25, 1956, Ser. No. 618,329
13 Claims. (Cl. 99—339)

This invention relates to a warming rack for toasters, and more particularly is concerned with a removable rack for supporting toast or the like above the upper surface of an automatic toaster.

In the past, many racks have been devised for supporting toast above a toaster so that the toast will not become cold while other toast is being prepared. These prior art devices have usually been expensive and complicated, requiring elaborate clamping devices involving nuts and bolts for clamping the rack to the toaster. Further, metal plates of the supporting platform of the prior art devices have shielded the toast from the limited heat emanating from the toaster, and thus in many instances do not transmit sufficient heat to accomplish their purposes. Also in the prior art are racks of wire which support the toast at an angle over the toaster and the toast so supported is heated unevenly and any butter on the toast tends to drain therefrom.

Contrary to the prior art devices, I have devised a warming rack which is removably mounted on the top of the toaster and requires no separate clamps, bolts or the like. This rack may be detached from or attached to the toaster in a matter of seconds and will fit substantially all makes of toasters. The toast supporting element includes a flat wire rack which permits even warming of the toast with no appreciable heat being lost to the supporting element.

Of primary importance in devices of this type is the cost of manufacture, since in order to be commercially successful the device must be marketed at a reasonable price and must be well suited for mass production. Again, contrary to the prior art, I have an extremely inexpensive mechanism which is well suited to be mass produced.

Accordingly, it is an object of the present invention to provide a warming rack which is inexpensive to manufacture, durable in structure and easily installed or removed from a toaster.

Another object of my invention is to provide a warming rack which is well suited for mass production manufacture.

Another object of my invention is to provide a warming rack which may be installed on any one of many makes of toasters.

Another object of my invention is to provide a warming rack for toast which will permit the heat emerging from the top of a toaster to heat evenly the toast placed upon the supporting element of the rack.

Another object of my invention is to provide a warming rack for toast, the supporting element of which may be easily rotated away from the top of the toaster to permit ready access to the toast being prepared in the toaster.

Another object of my invention is to provide a warming rack which when installed on a toaster will not interfere with the normal operation of the toaster.

Other and further objects and advantages of the present invention will become apparent from the following description of embodiments of the inventive concept of my invention when taken in conjunction with the accompanying drawings wherein like characters of reference designate corresponding parts throughout the several views, and wherein:

Fig. 1 is a perspective view of one embodiment of my invention shown attached to a conventional electric toaster.

Fig. 2 is a plan view of the device shown in Fig. 1, removed from the toaster.

Fig. 3 is a side elevational view of the warming rack shown in Fig. 2.

Fig. 4 is an end elevational view of the warming rack shown in Fig. 2.

Fig. 5 is a plan view of the invention showing a modified form of the clamping element.

Fig. 6 is a side elevational view of the warming rack shown in Fig. 5.

Fig. 7 is an end elevational view of the warming rack shown in Fig. 5.

Fig. 8 is a plan view of a modified form of the supporting element suitable for use in the warming rack of Fig. 1 or Fig. 5.

Figure 9:
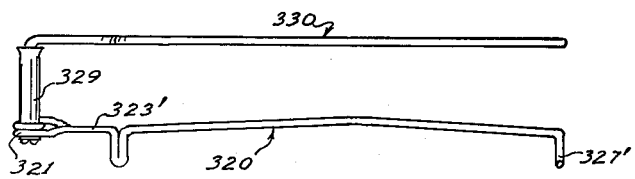
Fig. 9 is a side elevation of still another modification of my invention.

While the embodiments chosen for purpose of illustration represent my inventive concept in warming racks, it will be understood that variations in shape, form and size, as well as substitution of equivalents and combining of elements may be resorted to without departing from the scope of my invention.

Broadly speaking, my warming rack comprises two elements, a detachable clamping element 20 which is connected to the toaster 10 and a warming or supporting element 30 which supports the toast. The aforesaid elements are connected together by journal and bearing members so that the supporting element 30 is carried by the clamping element 20 and is disposed in a horizontal plane above the upper surface of a toaster. Because of this pivotal mounting, the supporting element 30 is arranged in cantilever fashion spaced over the bread receiving slots of the toaster 10 and may be pivoted out of position over these slots when bread is inserted or the toasted bread is removed from the slots.

Referring now in detail to the embodiment illustrated in Figs. 1–4 of the drawings, numeral 10 denotes generally a conventional electric toaster of the "pop up" variety having two bread receiving slots into which the bread to be toasted is inserted.

As is customary, these bread receiving slots are defined by outer edges 11, 11', inner edges 12, 12', and ends 13, 13', 14, 14' which comprise flanges projecting downwardly from the upper surface 15 of the toaster 10 to terminate a short distance within the toaster 10. The usual bread retaining wires 16 are arranged within the toaster and are spaced outwardly of outer edges 11, 11' and inwardly of inner edges 12, 12'.

The bread, of course, is received in the aforesaid slots and is lowered below surface 15 during the heating cycle of toaster 10, and upon completion of the heating cycle the toast is raised until the upper edge of the toast projects beyond and above the upper surface 15.

Since heated air rises, it is apparent that during and immediately after the heating cycle an appreciable amount of heat is emitted from the toaster through the slots of surface 15. My invention, therefore, contemplates the use of this heat by providing a rack for supporting the toast over the aforesaid slots during subsequent operating cycles of the toaster.

According to my invention, the detachable clamping element denoted in Figs. 1–4 by numeral 20 includes a single piece of wire with sufficient rigidity to be temporarily deformed to a clamping position and yet spring out to its original position when not retained. This wire is bent at its central portion to form a journal supporting loop 21 from which project a pair of normally diverging spring arms 22, 22', respectively. These arms 22, 22' extend a distance somewhat less than the length of a conventional toaster, such as toaster 10, and greater than the length of the bread receiving slots whence each arm is bent outwardly at roughly a 90 degree angle to provide a pair of outwardly extending spacer arms 23, 23'.

The length of each spacer arm 23, 23' should be greater than the length of ends 14 or 14' and yet shorter than the distance from the inner edge of one slot to the outer edge of the other slot of toaster 10. In other words, the length of arm 23 should be greater than the length of end 14 and less than the distance from outer edge 11 to inner edge 12'. Preferably, the length of either arm 23 or 23' should be slightly less than the distance from the longitudinal center line of the toaster to the outer edge of one slot.

At the outer ends of arms 23, 23' the wire is bent again, this time inwardly roughly 90 degrees to provide clamping arms or slot engaging arms which include short extensions 24, 24', intermediate slot engaging fingers 25, 25', finger connecting arms 26, 26' and terminal slot engaging fingers 27, 27'. In more detail, the final arms include the extensions 24, 24' which project a short distance and then are bent downwardly in an arc which curves inwardly then outwardly to terminate in abrupt 180 degree bends, and thence the wires return, in a contiguous manner with respect to the downwardly extending portion of the wires, to the point of origin, thereby providing intermediate, slot engaging fingers 25, 25'.

From this point, finger connecting arms 26, 26' extend in alignment, respectively, with extensions 24, 24' a distance slightly less than the length of the slots, and then are bent downwardly to terminate in projecting fingers 27, 27'. Fingers 27, 27' are generally the same shape as fingers 25, 25' in that each curves inwardly then outwardly. The distance which fingers 25, 25', 27, 27' project below the remainder of the slot engaging arms is about equal or slightly greater than the height of the flanges forming edges 11, 11'. These fingers, however, are not sufficiently long to engage the heating elements when the clamping element is installed as shown in Fig. 1.

From an examination of Fig. 2 it will be seen that the slot engaging arms diverge from each other and are shorter than arms 22, 22'. Thus the slot engaging arms must be urged inwardly toward each other, thereby urging arms 22, 22' closer together, in order to install clamping element 20 on the upper surface 15. This installation is accomplished by compressing the slot engaging arms as described, then placing fingers 25, 25', 27, 27' in the slots of the toaster 10 and then releasing the slot engaging arms, whereby fingers 25, 27 engage edge 11 and fingers 25', 27' engage edge 11'. Of course, to remove the clamping element 20, the slot engaging arms are merely urged toward each other and the clamping element 20 lifted out of engagement with toaster 10.

In the manufacture of the clamping element 20, a piece of tubing is soldered, brazed or welded in place at loop 21, and this piece of tubing forms an upstanding journal member 29 which is the only support for the toast supporting element 30. In detail, the toast supporting element 30 is preferably formed of a single length of wire which includes a straight center bar 31. Center bar 31 is bent at its end at substantially 90 degrees to form outer edge section 32 which is again bent at about 90 degrees to form longitudinal edge bar 33. Edge bar 33 is about the same length as center bar 31 and is bent at 90 degrees to provide inner edge section 34 which terminates at the beginning end of center bar 31. Thence, the wire is bent upwardly and projects a short distance vertically, is curved in an arc, and projects downwardly to terminate in an abrupt 180 degree bend whence the wire returns along the same route to the beginning end of center bar 31. Thereby, a supporting hook or bearing member 35 is provided which is adapted to project into journal member 29.

Thereafter, the wire is again bent to form inner edge section 36 which is in alignment with edge section 34. Thence the wire is bent at approximately 90 degrees to provide a second edge bar 37 which is complementary with edge bar 33 and is bent again at 90 degrees to form a second outer edge section 38 in alignment with edge section 32. The end of edge section 38 terminates at the juncture of center bar 31 and edge section 32. Suitable means, such as by soldering brazing or welding, may be used to secure the ends of the wire forming supporting element 30 in place.

It is thus seen that supporting element 30 includes a flat, wire frame having longitudinally extending bars 31, 33 and 37, and transverse edges formed by sections 32, 38 and sections 34, 36. Further, it is seen that this frame is mounted in cantilever fashion by means of bearing member 35 to pivot in a horizontal plane about journal member 29.

In the second embodiment of my invention as illustrated in Figs. 5–7, the same supporting element 30 is provided together with the same journal member 29. The clamping element, however, has been modified and includes generally a U-shaped frame 120, to the central portion of which is secured journal member 29. In more detail, frame 120 includes a pair of diametrically opposed spacer arms 123, 123' which extend from journal member 29 to terminate in downwardly projecting fingers 125, 125' which are formed as described for fingers 25, 25'. From fingers 125, 125' finger connecting arms 126, 126', respectively, extend divergently at greater than 90 degree angles with respect to spacer arms 123, 123' and terminate in inwardly then downwardly and outwardly projecting fingers 127, 127'. Thus, it is seen that by urging arms 126, 126' together, fingers 125, 125', 127, 127' may be fitted into the slots of a toaster; and, when arms 126, 126' are released, these fingers will engage the outer edges of the bread receiving slot.

Still another modification is shown in Fig. 8 wherein only the supporting element is modified. In this embodiment, supporting element 230 includes a pair of U-shaped arms supported by a base from which projects the bearing member 235 which is adapted to extend into journal member 29.

In Fig. 8, one end of a piece of wire is first bent in the shape of a hook forming one part of the bearing element 235. Thence the wire extends outwardly to form inner edge section 236. Next the wire is bent at a right angle to provide longitudinal edge bar 237 and bent again at a right angle to provide outer edge section 238. Section 238 is bent at about 90 degrees to provide central bar 239 which extends parallel to bar 237 and is spaced inwardly therefrom. Spaced substantially the same distance from bar 239 that bar 239 is spaced from bar 237 is another central bar 231 which is parallel to and in the same plane with bars 237 and 239. The end of bar 231 is joined to the end of bar 239 by a cross piece 240 which lies contiguous with inner edge section 236. The other end of central bar 231 is provided with an outwardly extending outer edge section 232 which is bent at about 90 degrees to provide longitudinal edge bar 233 which is parallel to and in the same plane with bars 231, 237 and 239. Inwardly extending from bar 233 is inner edge section 234 which terminates in a hook forming part of bearing element 235.

As pointed out above, the warming or supporting element 230 is substituted for element 30 of the previous embodiments.

Figure 10:
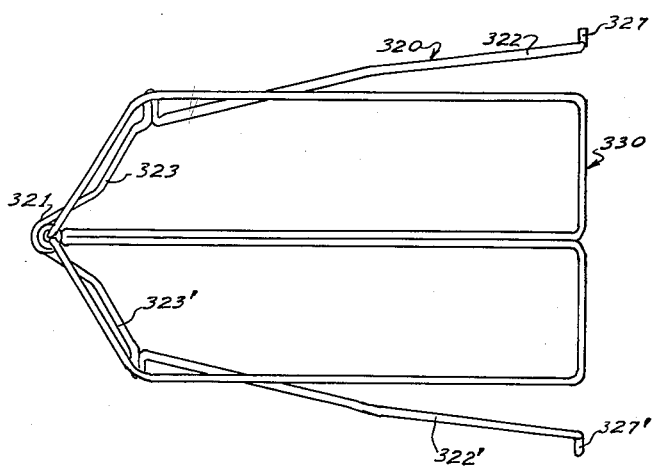
Fig. 10 is a plan view of the warming rack shown in Figs. 9 and 10.
Figure 11:
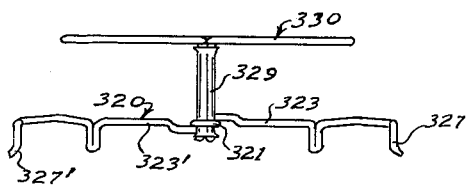
Fig. 11 is an end view of the warming rack shown in Figs. 9 and 10.

Referring to Figs. 9–11, the further modification of my invention includes a warming rack formed without solder, brazing or welding and includes the clamping element 320, the supporting element 330 and the journal member 329. The clamping element 320 includes a loop 321 which is a complete turn of wire around the hollow cylindrical journal member 329. From an examination of Figs. 9, 10 and 11, it is seen that this loop 321 is formed inwardly of clamping element 320 so that diverging arms 322, 322' which respectively extend from loop 321 will tighten the loop 321 when they are urged inwardly toward each other. Arms 322, 322' extend at an acute angle and their ends integrally connect with spacer arms 323, 323' which extend outwardly from each other at a greater angle than diverging arms 322, 322'. At the joinder of arm 323 with arm 322 is a slot engaging finger 325; and in like manner, at the joinder of arm 323' with arm 322' is a slot engaging finger 325'. The ends of arms 323, 323' are spaced from each other by a greater distance than the distance between edges 11, 11' and terminate in terminal slot engaging fingers 327, 327'.

In summation, the warming rack of my invention has a clamping element denoted by either numeral 20 or numeral 120 which has arms 26, 26' or 126, 126' which may be pressed together and then placed on the top or upper surface such as surface 15 of a toaster. Upon release of the arms 26, 26' or 126, 126' the fingers 25, 25', 27, 27' or fingers 125, 125', 127, 127' engage the outer edges of the bread receiving slots of the toaster, thus providing a readily detachable base or clamp which carries the supporting element denoted by numerals 30 or 230. This supporting element is adapted to be carried in cantilever fashion, being pivotally supported from one end by a journal member 29 which removably receives the bearing member 35. The supporting member 30 or 230 of course is adapted to rotate through a 360 degree arc and in use supports a piece of toast or a stack of toast over the heating elements of the toaster 10.

Thus, it is seen that after bread is placed in the toaster 10, the supporting element 30 is positioned as shown in full lines in Fig. 1 and is adapted to receive the previously prepared toast which is warmed by the heat of elements 16 as the bread within the toaster 10 is toasted. When this new toast pops up, the supporting element 30 may be rotated to the position shown by broken lines in Fig. 1 so that the toast within the toaster may be removed. Of course, since the supporting element 30 pivots horizontally, the toast on element 30 need not be removed and element 30 may be pivoted back to its original heating position when the toaster is subsequently used.

It is obvious to those skilled in the art that many variations may be made in the embodiments chosen for purpose of illustration without departing from the scope of my invention as defined by the appended claims.

I claim:

1. The combination with an electric toaster of a warming rack to said electric toaster for supporting toast in horizontal position over said toaster comprising a spacer member engaging the upper surface of said toaster, resilient arms connected to said spacer member, said arms being of such configuration as to be extending along the bread receiving slots of said toaster, engaging means extending from said arms and resiliently engaging the outer edges of said slots, and means pivotally carried by said spacer member for supporting said toast as aforesaid.

2. A warming rack for use with a toaster having an upper side with a pair of bread receiving slots therein, comprising spacer means, a pair of spaced resiliently positionable arms extending along said upper side from said spacer means, fingers extending from each of said arms for selective engagement with said upper side in said slots, a journal member projecting from said spacer means in a direction substantially perpendicular to the plane of said arms, a wire frame spaced from said arms in a plane substantially parallel to the plane of said arms, and bearing means at one end of said frame, said bearing means being received by said journal means whereby said wire frame is supported in cantilever fashion by said journal member and is adapted to pivot about said journal member.

3. The structure defined in claim 2 wherein said wire frame includes a central bar, a pair of outer bars and means connecting said bars.

4. The structure defined in claim 2 wherein said wire frame includes a central bar extending from said bearing means, a pair of outer bars arranged substantially parallel to said central bar, and outer edge members connecting the ends of the aforesaid bars.

5. The combination with a toaster having bread receiving slots along its upper surface of a warming rack comprising, a clamping element formed of wire, said clamping element including arm means, spacer arms extending from said arm means, said spacer arms being at least equal in length to the width of one of said slots and shorter in length than the distance from the inner edge of one of the slots of the toaster to the outer edge of the other of said slots, clamping arms extending from the ends of said spacer arms and diverging from each other, fingers projecting from said clamping arms and engaging the outer edges of said slots, and means connected to said arm means for supporting toast over said toaster.

6. The combination with a toaster having bread receiving slots along its upper surface of a warming rack comprising, a clamping element formed of wire, said clamping element including spacer arms extending from each other, resilient clamping arms extending from the ends of said spacer arms and normally diverging from each other, fingers projecting from said clamping arms and engaging the outer edges of said slots, a journal member connected to said spacer arms, and a supporting element, said supporting element including a flat wire frame and a bearing member projecting from said wire frame, said bearing member extending into said journal member whereby said supporting element is pivotable in a horizontal plane about said journal member for supporting toast in horizontal position over said toaster in one position of said supporting element.

7. The combination with a toaster having bread receiving slots along its upper surface of a warming rack comprising, a clamping element formed of wire, said clamping element including a central arm means being at least as long as said slots of said toaster and shorter than the length of said toaster, spacer arms extending from said arm means, said spacer arms being at least equal in length to the width of one of said slots and shorter in length than the distance from the inner edge of one of the slots of the toaster to the outer edge of the other of said slots, clamping arms extending from the ends of said spacer arms and diverging from each other, fingers projecting from said clamping arms and engaging the outer edges of said slots, a journal member carried by said arm means, and a supporting element, said supporting element including a horizontal wire frame and a bearing member projecting from said wire frame, said bearing member extending into said journal member whereby said supporting element is pivotable in a horizontal plane about said journal member for supporting toast in horizontal position over said toaster in one position of said supporting element.

8. A warming rack for attachment to a toaster having bread receiving slots in the upper surface comprising, a clamping element formed of wire, said clamping element including a central loop, spring arms extending generally in the same direction from said central loop, spacer arms extending outwardly from the ends of said spring arms, clamping arms extending from the ends of said spacer arms, slot engaging fingers projecting from said clamping arms and adapted to engage the outer edges of said slots, a journal member carried by said loop, and a supporting element, a bearing member projecting from said supporting element, said bearing member being adapted to extend into said journal member whereby said supporting element is adapted to pivot in a horizontal plane about said journal member for supporting toast in horizontal position over said toaster in one position of said supporting element.

9. The combination with a toaster having bread receiving slots along its upper surface of a warming rack comprising, a clamping element formed of wire, said clamping element including a central loop, spring arms extending from said central loop, said arms being at least as long as said slots of said toaster and shorter than the length of said toaster, spacer arms extending from the ends of said spring arms, said spacer arms being at least equal in length to the width of one of said slots and shorter in length than the distance from the inner edge of one of the slots of the toaster to the outer edge of the other of said slots, clamping arms extending from the ends of said spacer arms, fingers projecting from said clamping arms and engaging the outer edges of said slots, a journal member carried by said loop, and a supporting element, including a wire frame and a bearing member projecting from said wire frame, said bearing member extending into said journal member whereby said supporting element is pivotable in a horizontal plane about said journal member for supporting toast in horizontal position over said toaster in one position of said supporting element.

10. The combination with a toaster having bread receiving slots along its upper surface of a warming rack comprising, a clamping element formed of wire, said clamping element including a central loop, spring arms extending from said central loop, spacer arms extending in diametrically opposite directions from the ends of said spring arms, said spacer arms being at least equal in length to the width of one of said slots and shorter in length than the distance from the inner edge of one of the slots of the toaster to the outer edge of the other of said slots, clamping arms extending from the ends of said spacer arms and diverging from each other, fingers projecting from said clamping arms and engaging the outer edges of said slots, a journal member carried by said loop, and a supporting element, a bearing member projecting from said supporting element and extending into said journal member whereby said supporting element is pivotable in a horizontal plane about said journal member for supporting toast in horizontal position over said toaster in one position of said supporting element.

11. The combination with a toaster having bread receiving slots along its upper surface of a warming rack comprising, a clamping element formed of wire, said clamping element including a central loop, diverging spring arms extending generally in the same direction from said central loop, said diverging arms being at least as long as said slots of said toaster and shorter than the length of said toaster, spacer arms extending in diametrically opposite directions downwardly from the ends of said diverging arms, said spacer arms being at least equal in length to the width of one of said slots and shorter in length than the distance from the inner edge of one of the slots of the toaster to the outer edge of the other of said slots, clamping arms extending from the ends of said spacer arms and diverging from each other, a plurality of fingers projecting from each of said clamping arms and engaging the outer edges of said slots, the distance between all fingers on one of said clamping arms being less than the length of said slots, a journal member carried by said loop, and a supporting element, including a wire frame and a bearing member projecting from said wire frame, said bearing member extending into said journal member whereby said supporting element is pivotable in a horizontal plane about said journal member for supporting toast in horizontal position over said toaster in one position of said supporting element.

12. The structure defined in claim 10 wherein said wire frame is made from a single piece of wire and includes a central bar, outer edge bars spaced from said central bar, said outer bars being substantially parallel to and in the same horizontal plane of said central bar, and edge members connecting the ends of the aforesaid bars.

13. The structure defined in claim 11 wherein each of said fingers is curved inwardly and downwardly and then outwardly.

References Cited in the file of this patent
UNITED STATES PATENTS

| | | |
|---|---|---|
| 786,587 | Morgan et al. | Apr. 4, 1905 |
| 1,423,612 | Jewett | July 25, 1922 |
| 2,039,497 | Simons | May 5, 1936 |
| 2,290,450 | Renshin | July 21, 1942 |
| 2,493,222 | Braucht | Jan. 3, 1950 |
| 2,521,855 | Kodadek et al. | Sept. 12, 1950 |
| 2,604,884 | Walker | July 29, 1952 |
| 2,640,600 | Farr | June 2, 1953 |
| 2,677,518 | Happy | May 4, 1954 |
| 2,693,751 | Allen | Nov. 9, 1954 |
| 2,749,836 | Wedge | June 12, 1956 |
| 2,860,624 | Eddy | Nov. 18, 1958 |